US012728381B2

(12) United States Patent
Han et al.

(10) Patent No.: US 12,728,381 B2
(45) Date of Patent: Sep. 8, 2026

(54) OILPROOF ASSEMBLY, OILPROOF VENT VALVE, AND DEVICE WITH OIL TANK

(71) Applicant: Huizhou Voir Science & Technology Co., Ltd., Guangdong (CN)

(72) Inventors: Wenbo Han, Guangdong (CN); Zhixiang Chen, Guangdong (CN)

(73) Assignee: Huizhou Voir Science & Technology Co., Ltd., Guangdong (CN)

( * ) Notice: Subject to any disclaimer, the term of this patent is extended or adjusted under 35 U.S.C. 154(b) by 0 days.

(21) Appl. No.: 19/631,915

(22) Filed: Mar. 27, 2026

(65) Prior Publication Data

US 2026/0233149 A1 Aug. 13, 2026

Related U.S. Application Data

(63) Continuation of application No. 19/023,426, filed on Jan. 16, 2025, now abandoned.

(30) Foreign Application Priority Data

Mar. 25, 2024 (CN) ......................... 202420587874.0
Oct. 8, 2024 (CN) ......................... 202411396005.0

(51) Int. Cl.
*B01D 53/04* (2006.01)
*F16K 17/19* (2006.01)

(52) U.S. Cl.
CPC ...... *B01D 53/0415* (2013.01); *B01D 2258/02* (2013.01); *F16K 17/19* (2013.01)

(58) Field of Classification Search
CPC .. B01D 53/0415; B01D 2258/02; F16K 17/19
See application file for complete search history.

(56) References Cited

U.S. PATENT DOCUMENTS 11,118,996 B2 * 9/2021 Valles .................. G01M 15/09
2011/0062061 A1 * 3/2011 Chajec ................. B01D 36/001 210/90
2014/0263027 A1 * 9/2014 Schmitt ................ B01D 35/303 210/323.1

(Continued)

FOREIGN PATENT DOCUMENTS

CN 206468784 U 9/2017
CN 107289165 A * 10/2017 ............. F16K 17/19

(Continued)

*Primary Examiner* — Stephen Hobson
(74) *Attorney, Agent, or Firm* — Birchwood IP

(57) ABSTRACT

Disclosed are an oilproof assembly, an oilproof vent valve, and a device with an oil tank. The oilproof assembly includes: a valve body, wherein a cavity is formed in the middle, the valve body includes a first end and a second end; a first filter element arranged in the cavity at the first end; a limiting part arranged in the cavity at the second end; and an elastic part arranged between the first filter element and the limiting part and configured to apply a thrust to the filter element after the first filter element absorbs oil to swell, so that at least part of oil absorbed in the first filter element can be extruded by the thrust of the elastic part. According to the oilproof assembly, the oilproof vent valve, and the device with the oil tank, the maintenance cost can be reduced, and the service life can be prolonged.

18 Claims, 6 Drawing Sheets

(56) References Cited

U.S. PATENT DOCUMENTS

| | | | | |
|---|---|---|---|---|
| 2015/0041387 | A1* | 2/2015 | Mckenzie | B01D 35/30 210/435 |
| 2017/0128862 | A1* | 5/2017 | Malgorn | B01D 27/08 |
| 2019/0090036 | A1* | 3/2019 | Scope | F01P 11/12 |
| 2022/0161179 | A1* | 5/2022 | Healey | B01D 46/2414 |
| 2025/0269308 | A1* | 8/2025 | Semeniuk | B01D 46/2414 |
| 2025/0296029 | A1* | 9/2025 | Han | B01D 53/0415 |

FOREIGN PATENT DOCUMENTS

| | | | | | |
|---|---|---|---|---|---|
| CN | 112412575 | A | | 2/2021 | |
| CN | 112594427 | A | * | 4/2021 | A62C 4/00 |
| CN | 116447363 | A | * | 7/2023 | F16K 17/19 |
| CN | 116834544 | A | * | 10/2023 | B60K 15/03519 |
| CN | 117927713 | A | * | 4/2024 | B01D 53/22 |
| FR | 1406997 | A | * | 7/1965 | B01D 29/111 |
| JP | H01193474 | A | | 8/1989 | |
| WO | WO-2019183120 | A1 | * | 9/2019 | B01D 35/143 |
| WO | WO-2022131424 | A1 | * | 6/2022 | B01D 53/28 |

* cited by examiner

OILPROOF ASSEMBLY, OILPROOF VENT VALVE, AND DEVICE WITH OIL TANK

TECHNICAL FIELD

The present application relates to the technical field of oilproofness, and particularly relates to an oilproof assembly, an oilproof vent valve, and a device with an oil tank.

BACKGROUND OF THE INVENTION

A conventional device with an oil tank, for example, a gearbox (an automobile decelerator, a transmission or a three-in-one oil cooled motor) usually needs an oilproof ventilating valve to balance a pressure difference between inside and outside of a tank body and prevent pollutants from entering the tank body. Oilproof ventilating products on the current market usually use a valve body with a filter cartridge to filter oil gas or oil mist in the tank body, so as to prevent the air permeability of a waterproof ventilating film from being affected as the oil gas accumulates on a surface of the waterproof ventilating film.

However, with the passage of the service time, the filter cartridge has a filtering saturation condition, which not only causes an insufficient filtering effect of the filter cartridge, but also affects the performance of the product as the air permeability of the filter cartridge is attenuated, so that the requirement on oilproofness and ventilation cannot be met. To ensure the filtering and ventilating effects of the filter cartridge, it is necessary to replace the filter cartridge timely or actively discharge oil from the filter cartridge. Regardless of the replacement of the filter cartridge or active oil discharge, the filter cartridge needs to be maintained frequently, so that the maintenance cost of the oilproof vent valve is increased. Moreover, if the filter cartridge is not maintained thoroughly, the service life of the oilproof vent valve and even a terminal product will be shortened.

BRIEF SUMMARY OF THE INVENTION

In order to solve the above problems existing in the prior art, the present application discloses an oilproof assembly, an oilproof vent valve, and a device with an oil tank, where the service life of the oilproof assembly can be prolonged.

The present application provides the following technical solution:

In a first aspect, an oilproof assembly, including:

a valve body, where a cavity penetrating through both ends of the valve body is formed in the middle, the valve body includes a first end and a second end, an oil passing port communicating the cavity and an exterior is arranged at the first end, and the cavity at the second end is configured to communicate with an external ventilating channel;

a first filter element arranged in the cavity at the first end;

a limiting part arranged in the cavity at the second end and provided with a ventilating through hole;

an elastic part arranged between the first filter element and the limiting part and configured such that after the first filter element absorbs oil to swell, at least part of oil absorbed in the first filter element is capable of being extruded by a thrust of the elastic part;

a first pressing plate, where one side of the first pressing plate abuts against the first filter element, the first pressing plate is provided with a plurality of first air vents, and the first air vents are opposite to the first filter element; and a plurality of steps, where the steps abut against the other side of the first pressing plate, and a blank area is formed between the oil passing port and the first pressing plate through the steps.

In an embodiment, diversion trenches are arranged between the steps and between the steps and a cavity wall of the cavity, and the first air vents are opposite to the diversion trenches.

In an embodiment, the oil passing port is a strip-shaped port, one end of each of the diversion trenches is opposite to the strip-shaped port, and a slope is arranged between each of the diversion trenches and the oil passing port.

In an embodiment, a first seal ring is arranged at a periphery of the first pressing plate, and the first pressing plate hermetically abuts against a cavity wall of the cavity through the first seal ring.

In an embodiment, the oilproof assembly further includes:

a second pressing plate, where one side of the second pressing plate abuts against the first filter element, the other side thereof abuts against one end of the elastic part, the second pressing plate is provided with a plurality of second air vents, and the second air vents are opposite to the first filter element; and positioning structures for positioning the elastic part are arranged in the middle of the second pressing plate and the middle of the limiting part.

In an embodiment, a second seal ring is arranged at a periphery of the second pressing plate, and the second pressing plate hermetically abuts against a cavity wall of the cavity through the second seal ring.

In an embodiment, the oilproof assembly further includes:

a waterproof ventilating film arranged in the cavity at the second end and located between the limiting part and the ventilating channel.

In an embodiment, the oilproof assembly further includes:

a second filter element arranged between the limiting part and the ventilating channel.

In an embodiment, the oilproof assembly includes:

a waterproof ventilating film arranged in the cavity at the second end and located between the limiting part and the ventilating channel; and a separator plate, where one side of the separator plate abuts against the second filter element and the other side thereof abuts against one side of the waterproof ventilating film, the separator plate is provided with a plurality of third air vents, and the third air vents are opposite to the second filter element.

In an embodiment, the diameter of the side of the limiting part close to the second filter element is greater than the diameter of the side close to the first filter element, and the diameter of the second filter element is greater than the diameter of the first filter element.

In an embodiment, the first filter element is of a filter structure formed by stacking a plurality of filter cartridges.

In an embodiment, the elastic part is configured to:

not extrude oil in the first filter element when the first filter element does not absorb the oil or absorbs the oil to swell and the thrust applied by the elastic part to the first filter element is less than a preset value; and extrude at least part of the oil in the first filter element when the first filter element absorbs the oil to swell and the thrust applied by the elastic part to the first filter element is greater than or equal to the preset value.

In a second aspect, the present application further provides an oilproof vent valve, including:

an oilproof assembly; and a protective cover arranged at a second end of a valve body of the oilproof assembly, the ventilating channel being arranged between the protective cover and the valve body, where the oilproof assembly is the oilproof assembly according to any one described above.

In a third aspect, the present application further provides a device with an oil tank, including:

an oil tank; and an oilproof vent valve mounted on the oil tank, the oilproof vent valve being the oilproof vent valve described above.

It can be known from above that according to the oilproof assembly, the oilproof vent valve, and the device with an oil tank provided by the present application, the oilproof assembly is provided with the first filter element and the limiting part, and the elastic part is arranged between the limiting part and the first filter element. When oil gas or oil mist enters the cavity of the valve body via the oil port, the first filter element will swell after absorbing the oil gas or oil mist, and the elastic part applies the thrust to the first filter element. After the first filter element swells to a certain extent, the elastic part can automatically extrude residual oil in the first filter element and the oil can flow back through the oil passing port of the valve body. The oilproof assembly can avoid the problem that the filtering and ventilating performance of the oilproof assembly is affected as the first filter element is oversaturated, and needs not to be maintained frequently, so that the maintenance costs of the oilproof assembly, the oilproof vent valve, and the device with an oil tank are reduced, and the service lives thereof are prolonged.

DETAILED DESCRIPTION OF THE INVENTION

Figure 1:
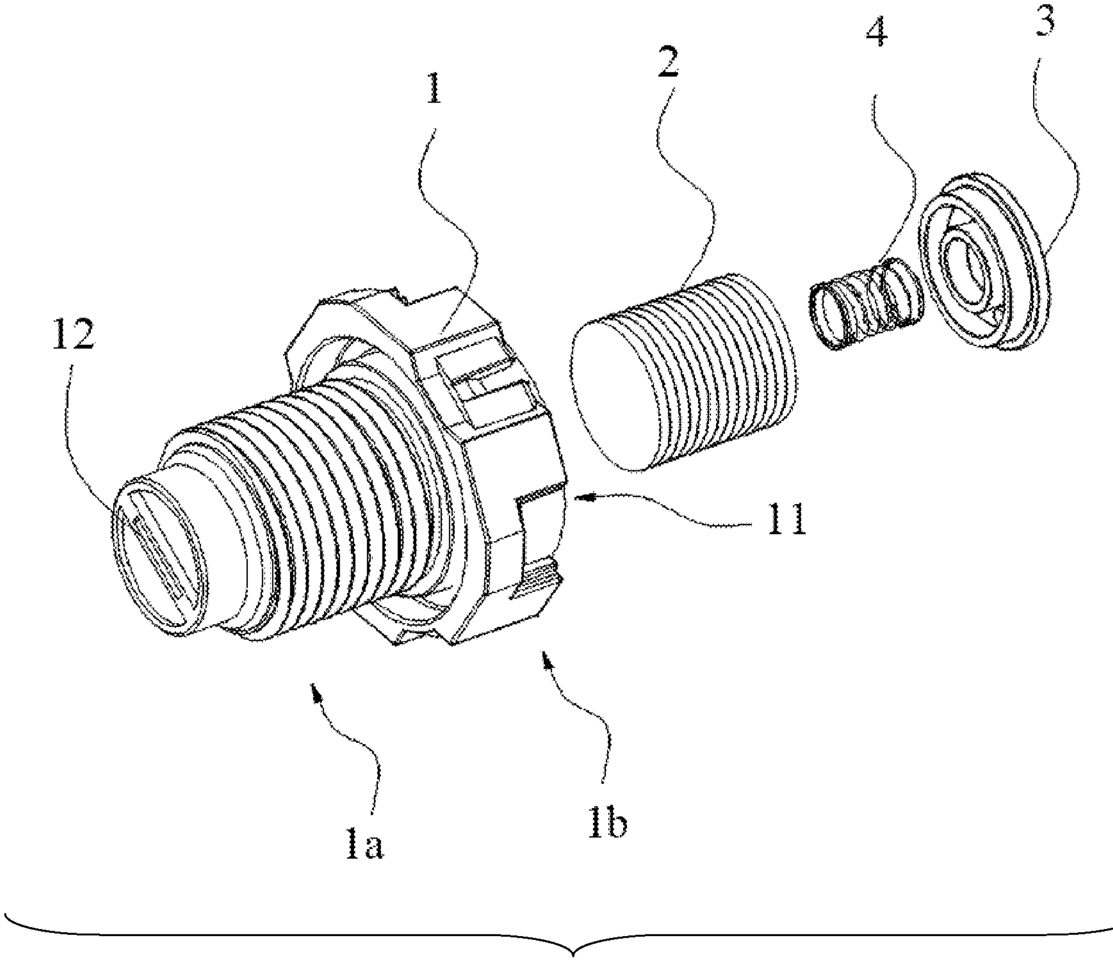
FIG. 1 is a schematic structural diagram of an oilproof assembly provided in an embodiment of the present application at an exploded viewing angle.

To facilitate understanding of the present application, the present application will be described more comprehensively in conjunction with drawings and specific embodiments. Preferred implementations of the present application are given in the drawings. However, the present application may be embodied in many different forms and should not be limited to the implementations set forth herein. Rather, these implementations are provided, so that the disclosed content of the present application will be understood more thoroughly and comprehensively.

Referring to FIG. 1, FIG. 1 shows a structure of an oilproof assembly provided in an embodiment of the present application at an exploded viewing angle.

As shown in FIG. 1, the oilproof structure includes a valve body 1, a first filter element 2, a limiting part 3, and an elastic part 4.

A cavity 11 penetrating through both ends of the valve body 1 is formed in the middle of the valve body 1, the valve body 1 includes a first end 1*a* and a second end 1*b*, an oil passing port 12 communicating the cavity 11 and an exterior is arranged at the first end 1*a*, and the cavity 11 at the second end 1*b* is configured to communicate with an external ventilating channel.

The valve body 1 can be made of a metal or a plastic, so that the structural strength of the valve body 1 is ensured. The valve body 1 can be mounted on a tank body of the oil tank as a mounting structure is arranged at the first end 1*a* or the second end 1*b*. For example, a thread connected and fixed to the tank body of the oil tank can be arranged outside the first end 1*a*. Of course, the valve body 1 can also be fixed with the tank body of the oil tank as a screw hole is formed at the second end 1*b*, and a specific fixing mode is not limited in the present application.

The first end 1*a* of the valve body 1 can be mounted on or in the tank body of the oil tank. The oil gas, oil mist or liquid oil in the oil tank can enter the cavity 11 of the valve body 1 through the oil passing port 12 formed at the first end 1*a* of the valve body 1 or enter the oil tank again through the oil passing port 12 from the cavity 11.

The second end 1*b* of the valve body 1 can be arranged on or outside the tank body of the oil tank. The cavity 11 at the second end 1*b* of the valve body 1 can be connected to the external ventilating channel, such that the gas in the oil tank is communicated with the external ventilating channel via the cavity 11. Specifically, the valve body 1 can be provided with an opening at the second end 1*b*, and the cavity 11 is communicated outside through the opening, such that the interior of the tank body of the oil tank and the exterior are ventilated via the cavity 11 of the valve body 1.

The first filter element 2 is arranged in the cavity 11 of the first end 1*a*. Specifically, the diameter of the first filter element 2 matches with the diameter of the cavity 11, such that the oil gas, oil mist or liquid oil entering the cavity 11 via the oil passing port 12 can be absorbed, and the gas discharged from the ventilating channel is basically free of the oil gas, oil mist or liquid oil. Therefore, an oilproof effect is realized.

In some embodiments, the first filter element 2 can be made of an oil absorption material such as sponge, fiber or another simple substance or composite material. In order to improve the adsorption effect on the oil gas, oil mist or liquid oil, the first filter element 2 can be of a filter structure formed by stacking a plurality of filter cartridges made of the oil absorption material. The oil gas, oil mist or liquid oil in the gas will be in contact with the outermost filter cartridge, and the first filter element 2 will absorb them in a saturated manner by hierarchy in sequence, such that the first filter element 2 can obtain a more uniform absorption effect. Moreover, the stacked filter structure can greatly increase the contact area between the filter cartridge and a substance to be filtered and the adsorption area for the oil gas, oil mist or liquid oil. Moreover, in the stacked arrangement, the first filter element 2 can improve the flow of a fluid among the layers to form a flow channel or an eddy current, which facilitates full contact between the fluid and the first filter element 2, thereby improving the adsorption efficiency.

Further, the first filter element 2 can further be added with an adsorbent for oil gas, oil mist or liquid oil to improve the adsorption effect, and moreover, by using a stacked filter structure, the adsorbent is distributed more uniformly in the filter block. With interlaminar flow of the fluid, all parts of the adsorbent can exert the adsorption effect fully to avoid excessive local use or insufficient use of the adsorbent, so that the utilization ratio of the adsorbent in the whole filter block is improved. It can be understood that the adsorbent can be an existing known adsorbent for oil gas, oil mist or liquid oil, which is not illustrated one by one herein.

It is relatively difficult to combine and optimize different absorbents for the whole absorbing filter block. A single type of absorbent can only be used often, which hardly adsorb various substances with different properties efficiently. In an embodiment, absorbents with different types or performances can be placed in different layers according to different adsorption requirements. For example, an adsorbent with a better adsorption effect on large particles can be placed in the first layer, and an adsorbent that selectively adsorbs special chemical components is placed in the second layer. In this combination mode, complex mixed substances can be adsorbed in a more targeted and efficient mode, so that the comprehensive adsorption performance of the filter block is improved.

A limiting part 3 is arranged in the cavity 11 at the second end 1*b* and provided with a ventilating through hole 31. The elastic part 4 is arranged between the first filter element 2 and the limiting part 3. The elastic part 4 is configured to, when the first filter element 2 absorbs oil to expand, apply a thrust to the filter element, so that at least part of oil absorbed in the first filter element 2 can be extruded by the thrust of the elastic part 4. In an embodiment, the elastic part 4 can be a spring or a material with an elastic deformation function, for example, rubber, which is not limited herein.

The limiting part 3 abuts against the cavity wall of the cavity 11 and limits the elastic part 4 within certain space between the first filter element 2 and the limiting part 3. When the first filter element 2 is in a state of not absorbing oil, the elastic part 4 can be arranged in a pre-compressed state or in an uncompressed state. After the first filter element 2 absorbs oil to expand, the volume will be increased as it absorbs the oil gas, oil mist or liquid oil, and in this case, the expanded first filter element 2 will extrude the elastic part 4, and the elastic part 4 will also apply a certain thrust to the first filter element 2.

When the oil in the first filter element 2 is unsaturated and the thrust applied by the elastic part 4 to the first filter element 2 is less than a preset value, the thrust applied by the elastic part 4 to the first filter element 2 is not enough to counteract the thrust applied by expansion of the first filter element 2 to the elastic part 4, and in this case, the oil in the first filter element 2 cannot be extruded by the elastic part 4. The first filter element 2 continuously absorbs the oil gas, oil mist or liquid oil, the elastic part 4 is further compressed continuously, and the thrust applied by the elastic part 4 to the first filter element 2 is increased continuously.

When the oil in the first filter element 2 is saturated to a certain extent and the thrust applied by the elastic part 4 to the first filter element 2 is greater than or equal to the preset value, the thrust applied by the compressed elastic part 4 to the first filter element 2 is greater than or equal to the thrust applied by expansion of the first filter element 2 to the elastic part 4, and in this case, the first filter element 2 cannot absorb oil to expand further, and the elastic part 4 will be extruded by part of oil in the first filter element 2. Under some circumstances, the extruded oil can flow back into the oil tank via the oil passing port 12.

The elastic part 4 is arranged in the oilproof assembly to apply a certain thrust to the first filter element when the first filter element 2 reaches a certain saturated extent, and residual oil in the first filter element 2 can be extruded to prevent the first filter element 2 from further absorbing the oil to affect the filtering and ventilating efficiency, so that the first filter element 2 will not be in a supersaturated state, so that the filtering and ventilating performance of the oilproof assembly is ensured.

In an embodiment, the preset value can be set as 6-15 N. The preset value can be slightly lower than the thrust to the elastic part 4 formed when the first filter element 2 fully reaches the saturated state, so that the first filter element 2 is always kept in the unsaturated state.

Of course, the preset value can also be set, so that the oil in the first filter element 2 is extruded only when the thrust applied by the compressed elastic part 4 to the first filter element 2 is greater than the thrust applied by expansion of the first filter element 2 to the elastic part 4. The preset value can be decided according to different filter materials, and the elastic modulus of the elastic part 4 is adjusted according to an actual measured result, so that the thrust applied by the elastic part 4 to the first filter element can be greater than or equal to the preset value when the first filter element 2 reaches a certain saturation, and the elastic part 4 extrudes the residual oil absorbed by the first filter element 2 smoothly.

Figure 2:
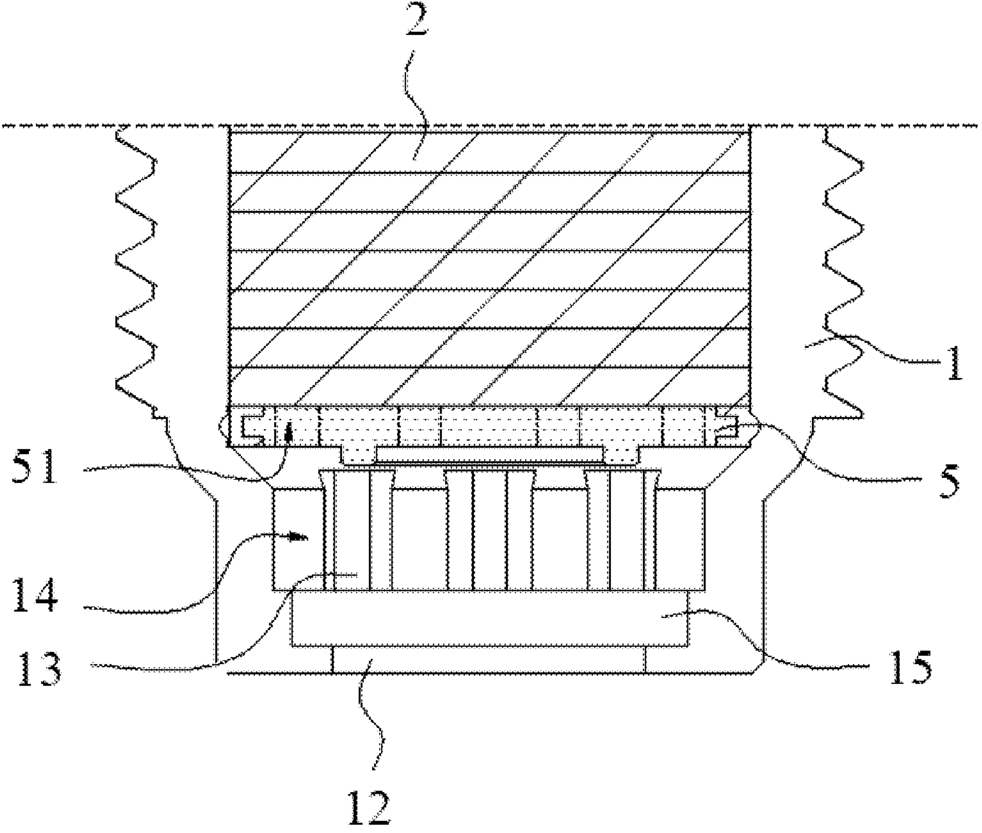
FIG. 2 is a cross-section schematic diagram of a part of structure of an oilproof structure provided in the embodiment of the present application.
Figure 3:
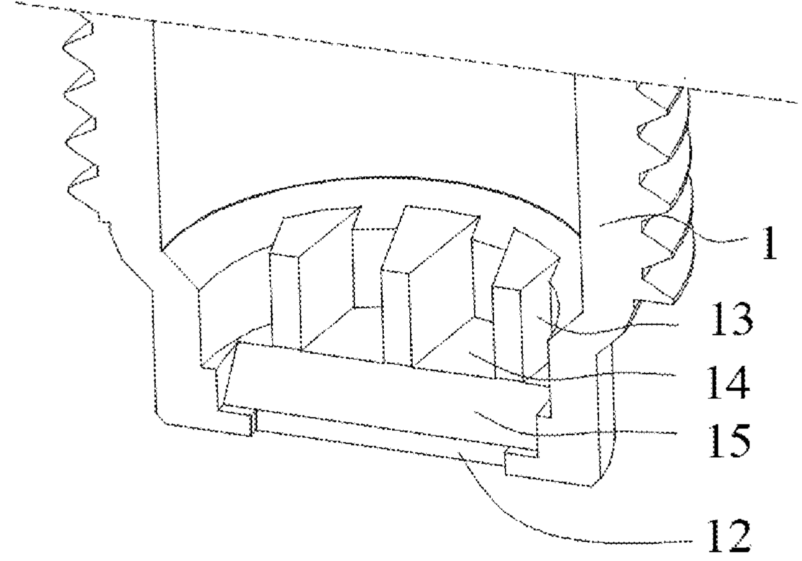
FIG. 3 is another cross-section schematic diagram of a part of structure of an oilproof structure provided in the embodiment of the present application.

Referring to FIGS. 2-3, schematic diagrams of a partial structural cross section and another cross section of the oilproof structure provided in the embodiment of the present application are shown.

As shown in FIGS. 2-3, besides the structure in FIG. 1, the oilproof structure further includes a first pressing plate 5 and a plurality of steps 13.

One side of the first pressing plate 5 abuts against the first filter element 2 and the other side thereof abuts against the steps 13. The first pressing plate 5 is provided with a plurality of first air vents 51, and the first air vents 51 are opposite to the first filter element 2. Moreover, a blank area is formed between the oil passing port 12 and the first pressing plate 5 through the steps 13.

The first pressing plate 5 abuts against one side of the first filter element 2, and the diameter of the first pressing plate fits the diameter of the interior of the cavity 11, so that the periphery of the first pressing plate 5 can abut against the inner wall of the cavity 11. Moreover, the first air vents 51 and the first filter element 2 are opposite in position, so that the oil gas, oil mist or liquid oil are guided by the first air vents 51 to enter the first filter element 2 or the gas or oil in the first filter element 2 is discharged from the first air vents 51, so that the filter performance of the oilproof assembly is improved. The blank area is formed between the oil passing port 12 and the first pressing plate 5 through the steps 13. The gas enters the blank area of the cavity 11 through the oil passing port 12 and enters the first filter element 2 through the first air vents 51, so that the ventilating performance of the oilproof assembly can be improved. It can be understood that there can be many first air vents 51, and a specific quantity can be determined according to an actual demand.

In an embodiment, diversion trenches 14 are arranged between the steps 13 and between the steps 13 and a cavity wall of the cavity 11, and the first air vents 51 are opposite to the diversion trenches 14. Provided to the gas in the oil tank to flow in, the first air vents 51 are also provided to the oil extruded by the elastic part 4 to flow out. The oil extruded by the elastic part 4 can flow into the diversion trenches 14 through the first air vents 51 and flow back into the oil tank again finally from the oil passing port 12 via the diversion trenches 14. The design of the diversion trenches 14 can ensure the backflow effect of the oil extruded, so as to prevent the oil from being accumulated in the cavity 11 to affect the ventilating performance.

Further, the oil passing port 12 is a strip-like port. One end of each of the diversion trenches 14 is opposite to the strip-like port. A slope 15 is arranged between each of the diversion trenches 14 and the oil passing port 12. The oil passing port 12 formed as the strip-like port can prevent the oil gas, oil mist or liquid oil in the oil tank from excessively entering the cavity 11 of the valve body 1 to affect the service life of the first filter element 2. Moreover, the slope 15 is arranged between each of the diversion trenches 14 and the oil passing port 12 to better discharge the liquid oil in each of the diversion trenches 14 via the oil passing port 12, so as to ensure the filtering and ventilating performance of the oilproof assembly, thereby prolonging the service life of the oilproof assembly. Of course, the shape of the oil passing port 12 is not limited to strip, but the oil passing port can also be arranged in shape of rectangle, triangle or round, which can play a role of reducing the oil gas, oil mist or liquid oil from entering the valve body 1.

Figure 4:
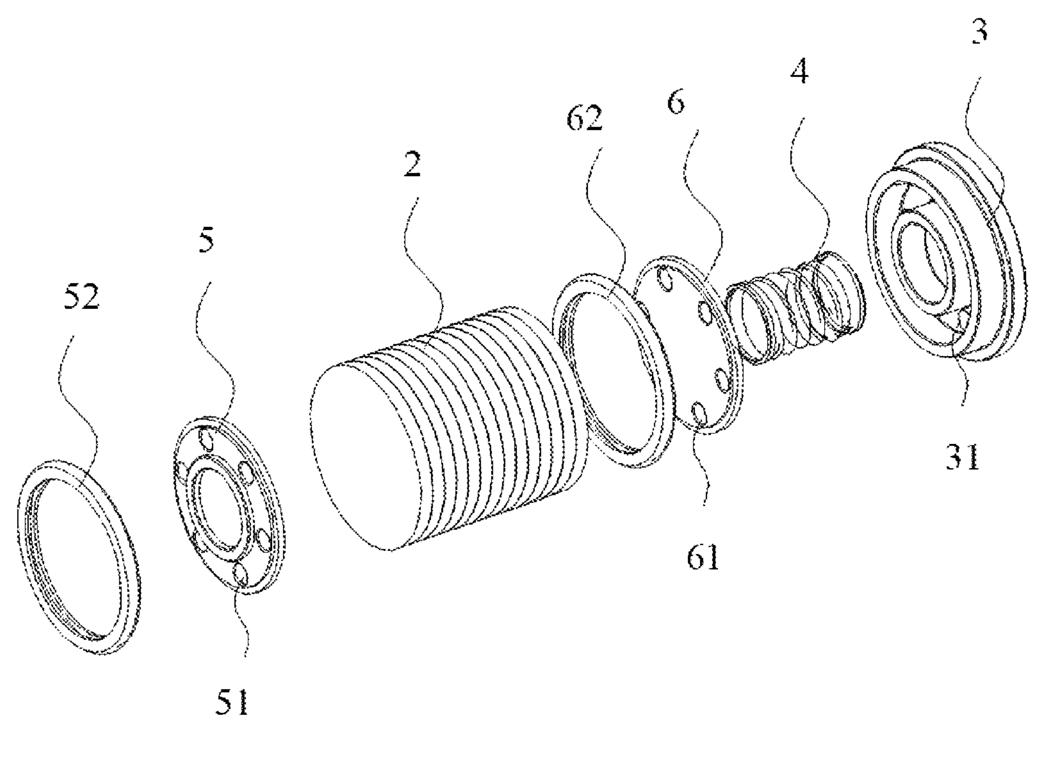
FIG. 4 is a schematic structural diagram of a part of structure in the oilproof assembly provided in an embodiment of the present application at an exploded viewing angle.

Referring to FIG. 4, a structure of a part of structure in an oilproof assembly provided in an embodiment of the present application at an exploded viewing angle is shown.

As shown in FIG. 4, besides the structure shown in FIGS. 1-3, the oilproof assembly can further include a second pressing plate 6, a first seal ring 52, and a second seal ring 62. One side of the second pressing plate 6 abuts against the first filter element 2 and the other side thereof abuts against one end of the elastic part 4. The second pressing plate 6 is provided with a plurality of second air vents 61, and the second air vents 61 are opposite to the first filter element 2. Similar to the first pressing plate 5, the second air vents 61 of the second pressing plate 6 can guide the gas in the first filter element 2 to be discharged via the second air vents 61 or the gas at the second end enters the first filter element 2 from the second air vents 61, so that the filtering and ventilating performance of the first filter element 2 is improved.

In an embodiment, positioning structures for positioning the elastic part 4 are arranged in the middle of the second pressing plate 6 and the middle of the limiting part 3. By arranging the positioning structures, the elastic part 4 can act on the middle of the second pressing plate 6. Matched with the abutting effect of the second pressing plate 6 on the first filter element 2, the uniformity of the thrust applied by the elastic part 4 to the first filter element 2 via the second pressing plate 6 can be improved, so that the extrusion effect of the oil in the first filter element 2 is improved. Further, if the oilproof assembly is provided with the first pressing plate 5, one side of the first pressing plate 5 abuts against the bottom of the first end and the second pressing plate 6 abuts against the elastic part 4, so that when the elastic part 4 applies the thrust to the second pressing plate 6, the first filter element 2 is subjected to action forces of the first pressing plate 5 and the second pressing plate 6 at the same time, so that an effect of better discharging the residual oil in the first filter element 2 can be obtained.

In another embodiment, a first seal ring 52 is arranged at a periphery of the first pressing plate 5, and the first pressing plate 5 hermetically abuts against a cavity wall of the cavity 11 through the first seal ring 52. There will inevitably be gaps between the pressing plate 5 and the cavity 11 and the first filter element 2 and the cavity wall of the cavity 11 due to manufacturing errors. The first seal ring 52 can prevent the oil gas, oil mist or liquid oil from directly penetrating through the gaps between the pressing plate 5 and the cavity 11 and the first filter element 2 and the cavity wall of the cavity 11 to be discharged, so that the filtering effect on the gas entering the valve body 1 can be improved. Further, if the second end of the valve body 1 is provided with a waterproof ventilating film 8, the first seal ring 52 can further prolong the service life of the waterproof ventilating film 8, so that the service life of the overall oilproof vent valve is prolonged.

In another embodiment, if the oilproof assembly is provided with a second pressing plate 6, the second seal ring 62 is arranged at the periphery of the second pressing plate 6, so that the second pressing plate 6 hermetically abuts against the cavity wall of the cavity 11 through the second seal ring 62. The effect of the second seal ring 62 may refer to the effect of the first seal ring 52 to prolong the service life of the overall oilproof vent valve. Of course, in an actual application, the seal ring can only be arranged on the first pressing plate 5 or the second pressing plate 6, and the seal ring can also be arranged on both the first pressing plate 5 and the second pressing plate 6 according to actual demands.

Figure 5:
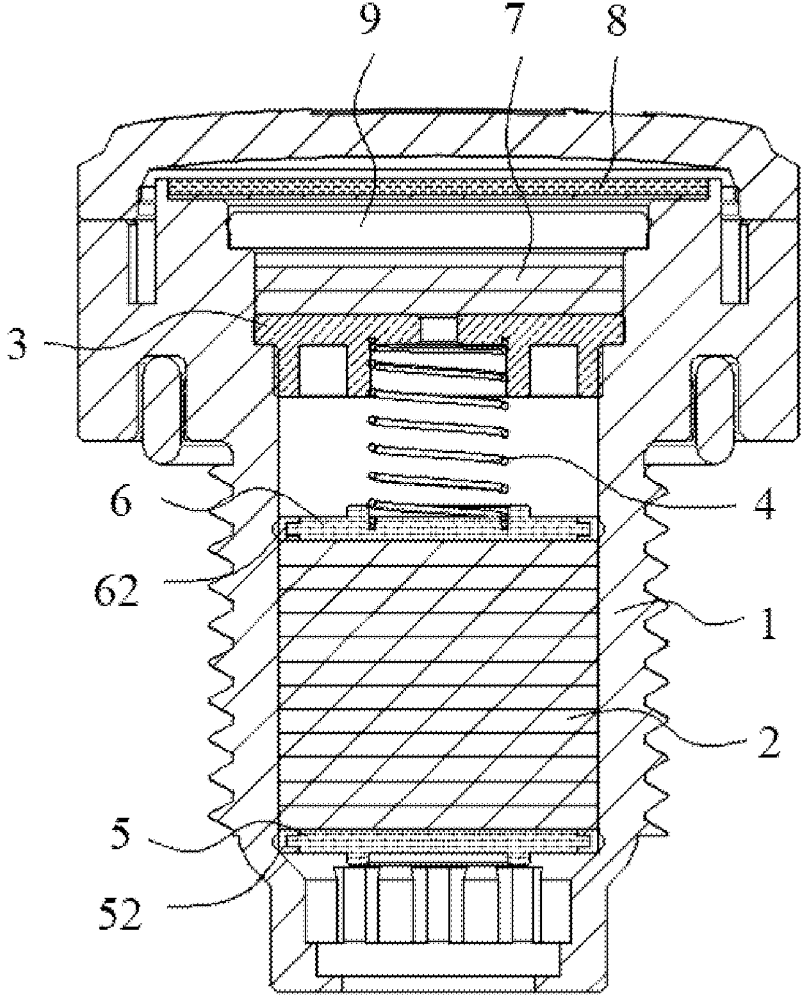
FIG. 5 is an overall cross-section schematic diagram of the oilproof structure provided in the embodiment of the present application.
Figure 6:
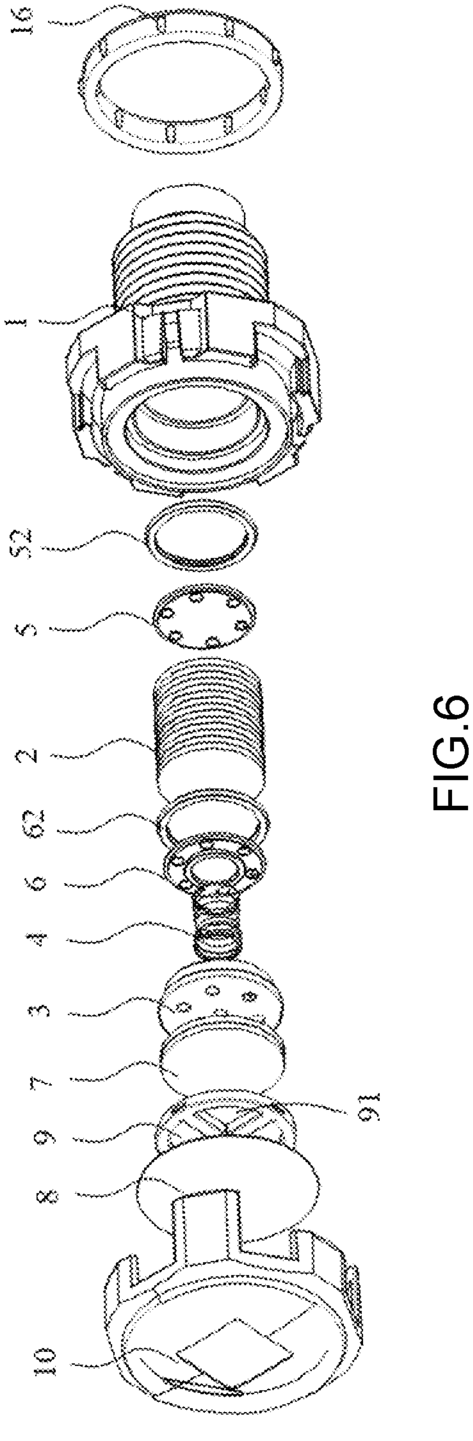
FIG. 6 is a schematic structural diagram of an oilproof assembly provided in the embodiment of the present application at another exploded viewing angle.

Referring to FIGS. 5-6, an overall sectional structure and another structure at an exploded viewing angle of the oilproof assembly provided in an embodiment of the present application are shown.

As shown in FIGS. 5-6, the oilproof structure includes a valve body 1, a first filter element 2, a limiting part 3, and an elastic part 4.

A cavity 11 penetrating through both ends of the valve body 1 is formed in the middle of the valve body 1, the valve body 1 includes a first end and a second end, an oil passing port 12 communicating the cavity 11 and an exterior is arranged at the first end, and the cavity 11 at the second end is configured to communicate with an external ventilating channel. The first filter element 2, the elastic part 4, and the limiting part 3 all are arranged in the cavity 11 in sequence. The elastic part 4 is configured to, when the first filter element 2 absorbs oil to expand, apply a thrust to the filter element, so that at least part of oil absorbed in the first filter element 2 can be extruded by the thrust of the elastic part 4.

Specifically, the oilproof structure further includes a first pressing plate 5 and a second pressing plate 6. The first pressing plate 5 abuts against the cavity wall of the cavity 11 through the first seal ring 52 and the second pressing plate 6 abuts against the cavity wall of the cavity 11 through the second seal ring 62. When the first filter element 2 absorbs oil to expand to a certain saturated extent and the thrust of the elastic part 4 to the first filter element 2 through the second pressing plate 6 reaches the preset value, residual oil in the first filter element 2 will be extruded. The extruded oil flows out via the first air vents 51 in the first pressing plate 5 and the oil passing port 12, so that the first filter element 2 will not be in an oversaturated state, ensuring the filtering and ventilating performance of the first filter element 2 in the oilproof assembly. Further, the first seal ring 52 can be sleeved on the periphery of the first pressing plate 5, the second seal ring 62 can be sleeved on the periphery of the second pressing plate 6, and the first seal ring 52 and the second seal ring 62 play a role of improving the filtering effect. Of course, the first seal ring 52 and the second seal ring 62 can be independently used or simultaneously used according to demands.

In the embodiment, in order to improve the reliability of the ventilating function of the oilproof assembly, the oilproof assembly further includes a second filter element 7 and a waterproof ventilating film 8. The waterproof ventilating film 8 is arranged in the cavity 11 at the second end and located between the limiting part 3 and the ventilating channel. The waterproof ventilating film 8 can be e-PTFE or another film material capable of achieving waterproof and ventilating functions. By arranging the waterproof ventilating film 8, on the premise of ensuring the oilproof function, a condition that the oil absorbing property of the filter element is affected as external dust or water vapor enters the valve body 1 is avoided.

The second filter element 7 is arranged between the limiting part 3 and the external ventilating channel and arranged between the limiting part 3 and the waterproof ventilating film 8. The second filter element 7 can further filter and absorb the oil gas, oil mist or liquid oil in the gas filtered by the first filter element 2, so that the oilproof effect is ensured. The influence of the oil gas, oil mist or liquid oil on the waterproof ventilating film 8 is affected, so that the service life of the waterproof ventilating film 8 is prolonged.

In an embodiment, the diameter of one side of the limiting part 3 close to the second filter element 7 is greater than the diameter of one side close to the first filter element 2, and the diameter of the second filter element 7 is greater than the diameter of the first filter element 2. By designing the limiting part 3, the oil gas, oil mist or liquid oil filtered by the first filter element 2 can be in contact with the second filter element 7 as much as possible and will not flow out of the second filter element 7 from the gap between the second filter element 7 and the cavity wall of the cavity 11 to affect the oilproof effect. Moreover, the through hole 31 in the limiting part 3 can be opposite to the second filter element 7, so that the filtering effect of the second filter element 7 on the oil gas, oil mist or liquid oil is improved.

Similarly, the diameter of the second filter element 7 will also be relatively greater than the diameter of the first filter element 2, so that the filtering effect of the second filter element 7 is further improved. It can be understood that the diameters of the first filter element 2 and the second filter element 7 can be decided according to actual demands, which are not limited herein.

In order to further prolong the service life of the waterproof ventilating film 8, a separator plate 9 is arranged between the waterproof ventilating film 8 and the second filter element 7. One side of the separator plate 9 abuts against the second filter element 7 and the other side abuts against one side of the waterproof ventilating film 8. The separator plate 9 is provided with a plurality of third vent holes, and the third vent holes are opposite to the second filter element 7. The separator plate 9 can separate the waterproof ventilating film 8 from the second filter element 7 to prevent oil absorbed by the second filter element 7 from polluting the waterproof ventilating film 8. Further, the third vent holes of the separator plate 9 can be formed as holes with a great proportion, so as to reduce the influence of the third vent holes on the ventilating property as much as possible.

A protective cover 10 is further arranged outside the second end of the valve body 1. The protective cover 10 places the waterproof ventilating film 8 in the valve body 1 for blocking external dust and silt from entering the valve body 1, so that the service lives of the waterproof ventilating film 8 and other structures inside can be prolonged. A gap or a slot may be reserved between the protective cover 10 and the valve body 1, to form the ventilating channel between the protective cover 10 and the valve body 1. Through the ventilating channel, the oilproof structure can have the oilproof ventilating effect.

Moreover, the first filter element 2 and the second filter element 7 both are of a filter structure formed by stacking a plurality of filter cartridges. Through the filter structure formed by stacking the filter cartridges, the filtering performance can be improved. Of course, the first filter element 2 and the second filter element 7 can also be made of an overall filter material according to actual demands, which are not limited herein.

An external thread and a mounting sealing part 16 can also be arranged outside the valve body 1. The external thread and the mounting sealing part 16 can ensure that the valve body 1 and the oil tank are in a sealed state when the valve body 1 is mounted on the oil tank, and they are conveniently disassembled and used.

Through the above design, substances such as gases carrying the oil gas or oil mist and liquid oil in the oil tank enter the cavity 11 through the oil passing port of the valve body 1 and are secondarily filtered through the first filter element 2 and the second filter element 7, so that the oilproof function is achieved. Moreover, the arranged waterproof ventilating film 8 can match with the first filter element 2 and the second filter element 7 to achieve the ventilating function of the oilproof assembly.

During work, when the oil in the first filter element 2 is unsaturated and the thrust applied by the elastic part 4 to the first filter element 2 is less than a preset value, the thrust applied by the elastic part 4 to the first filter element 2 is not enough to counteract the thrust applied by expansion of the first filter element 2 to the elastic part 4, and in this case, the oil in the first filter element 2 cannot be extruded by the elastic part 4. The first filter element 2 continuously absorbs the oil gas, oil mist or liquid oil, the elastic part 4 is further compressed continuously, and the thrust applied by the elastic part 4 to the first filter element 2 is increased continuously. When the oil in the first filter element 2 is saturated to a certain extent and the thrust applied by the elastic part 4 to the first filter element 2 is greater than or equal to the preset value, the thrust applied by the compressed elastic part 4 to the first filter element 2 is greater than or equal to the thrust applied by expansion of the first filter element 2 to the elastic part 4, and in this case, the first filter element 2 cannot absorb oil to expand further, and the elastic part 4 will be extruded by part of oil in the first filter element 2. Under some circumstances, the extruded oil can flow back into the oil tank via the oil passing port 12.

It can be known from the above that the design of the oilproof assembly can avoid the problem that the filtering and ventilating performance of the oilproof assembly is affected as the first filter element 2 is oversaturated, and meet the oilproof and ventilating demands of the device without frequent maintenance, so that the maintenance costs of the oilproof assembly, the oilproof vent valve, and the device with an oil tank are reduced, and the service lives thereof are prolonged.

Figure 7:
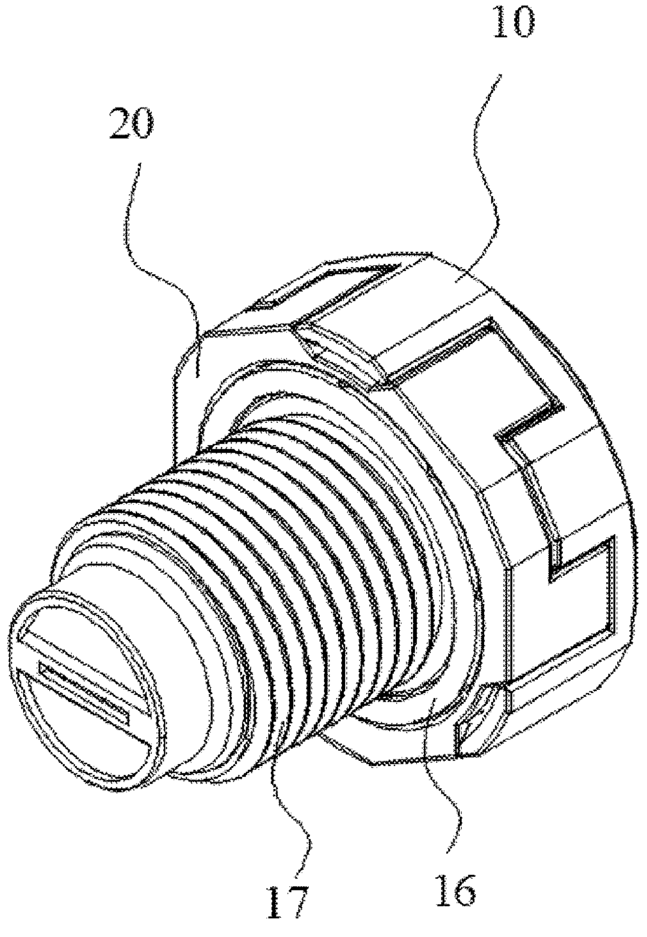
FIG. 7 is a schematic structural diagram of an oilproof vent valve provided in the embodiment of the present application.

Referring to FIG. 7, a structure of the oilproof vent valve provided in the embodiment of the present application is shown.

As shown in FIG. 7, the oilproof vent valve includes an oilproof assembly 20 and a protective cover 10, where the protective cover 10 is arranged at a second end of a valve body of the oilproof assembly 20, and the ventilating channel is arranged between the protective cover 10 and the valve body. The protective cover 10 places the waterproof ventilating film in the valve body for blocking external dust and silt from entering the valve body, so that the service lives of internal structures inside the valve body can be prolonged. A gap or a slot may be reserved between the protective cover 10 and the valve body, to form the ventilating channel between the protective cover 10 and the valve body. Through the ventilating channel, the oilproof structure can have the oilproof ventilating effect.

The oilproof assembly 20 can include a valve body, a first filter element, a limiting part, and an elastic part. After the first filter element swells to a certain extent, the elastic part can automatically extrude residual oil in the first filter element and the oil can flow back through the oil passing port of the valve body. The oilproof assembly can avoid the problem that the filtering and ventilating performance of the oilproof assembly is affected as the first filter element is oversaturated, and needs not to be maintained frequently, so that the maintenance cost of the oilproof vent valve is reduced, and the service life thereof is prolonged.

In addition, the oilproof vent valve can further include an external thread 17 and a mounting sealing part 16. The external thread 17 and the mounting sealing part 16 can ensure that the valve body and the oil tank are in a sealed state when the valve body is mounted on the oil tank, and they are conveniently disassembled and used. Of course, the oilproof vent valve can further include other structures, which are not further limited herein.

A specific structure of the oilproof assembly 20 can refer to description in any embodiment of FIGS. 1-6, and the specific structure of the oilproof assembly 20 is not described in detail herein.

Figure 8:
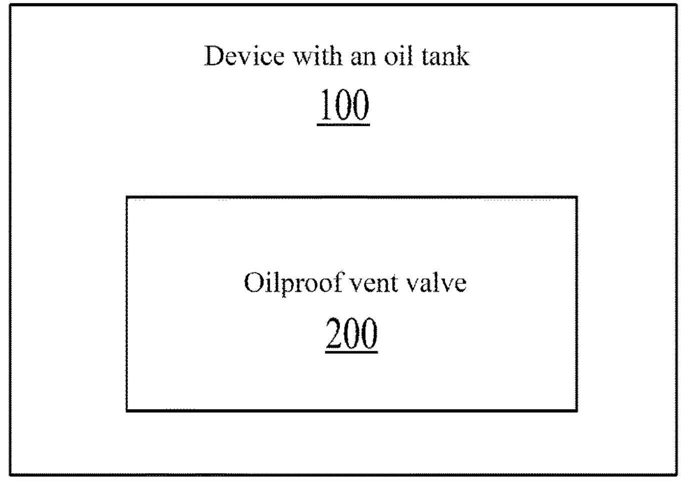
FIG. 8 is a schematic structural diagram of a device with an oil tank provided in the embodiment of the present application.

Referring to FIG. 8, a structure of a device with an oil tank provided in the embodiment of the present application is shown.

The device 100 with an oil tank can include an oil tank and an oilproof vent valve 200. The device 100 with an oil tank can be a gearbox such as an automobile decelerator, a transmission, an oil tank of a three-in-one oil cooled motor or another oil tank loading oil liquids. The oil tank and the type of the oil liquids contained in the oil tank are not limited in the present application.

Moreover, besides the oil tank, the device 100 with an oil tank can further include a gear, a rack and another mechanical structure used in the oil liquids in the oil tank. A specific mechanical structural type is not limited. Of course, the device 100 with an oil tank can also be an automobile, a steamer or another device 100 with the oil tank or a power system thereof.

The oilproof vent valve 200 can refer to the description of the oilproof assembly in any embodiment of FIGS. 1-7 and the oilproof vent valve 200 formed thereby, for example, including parts such as a valve body 200, the first filter element, the limiting part, and the elastic part, so as to achieve the oilproof ventilating effect through the oilproof assembly, which is not further limited herein.

When the device 100 with an oil tank uses the oilproof vent valve 200 in the embodiment of the present application, the technical effects of reducing the maintenance cost and improving the oilproofness and ventilation can also be achieved. Moreover, the oilproof vent valve 200 can further reduce the risk of explosion of the device by means of the oilproof ventilating function thereof, so as to improve the reliability of the device 100.

It should be noted that, when a component is referred to as being "fixed to" another component, it may be directly fixed to the another component or there may be components therebetween. It is to be noted that when one component is regarded as being "connected with" another component, the component can be directly connected to another component or a component arranged in the center may exist as well.

It should be understood that orientation or position relationships indicated by terms: "length", "width", "upper", "lower", "front", "back", "left", "right", "vertical", "horizontal", "top", "bottom", "inner", "outer" and the like are orientation or position relationships indicated by the drawings and are only to describe the disclosure and simplify the description rather than indicates or implies that the indicated device or components must have specific orientations and are configured and operated in the specific orientations. Therefore, it cannot be construed as limitations to the present application.

In addition, the terms "first" and "second" are merely used for descriptive purposes and cannot be construed as indicating or implying relative importance or implicitly specifying the number of indicated technical features. Thus, features defining "first" and "second" can expressively or implicitly include one or more features. In the description of the present application, "a plurality of" means two or more, unless expressly specified otherwise.

Unless defined otherwise, all technical and scientific terms used herein have the same meaning as commonly understood by persons of ordinary skill in the art to which the present application belongs. The terms used herein in the specification of the present application are for the purpose of describing specific implementations only and are not intended to limit the present application.

The above content is merely examples and descriptions made on the structure of the present application, which is described specifically and detailedly, but is not to be construed as a limitation to the patent claims of the present application. It should be noted that several variations and modifications may also be made by those of ordinary skill in the art without departing from the concept of the present application, and these apparent alternative forms all fall within the protection scope of the present application.

The invention claimed is:

1. An oilproof assembly, comprising:

a valve body, wherein a cavity penetrating through both ends of the valve body is formed in the middle, the valve body comprises a first end and a second end, an oil passing port communicating the cavity and an exterior is arranged at the first end, and the cavity at the second end is configured to communicate with an external ventilating channel;

a first filter element arranged in the cavity at the first end;

a limiting part arranged in the cavity at the second end and provided with a ventilating through hole; and an elastic part arranged between the first filter element and the limiting part and configured such that after the first filter element absorbs oil to swell, at least part of oil absorbed in the first filter element is capable of being extruded by a thrust of the elastic part;

a first pressing plate, wherein one side of the first pressing plate abuts against the first filter element, the first pressing plate is provided with a plurality of first air vents, and the first air vents are opposite to the first filter element; and a plurality of steps, wherein the steps abut against the other side of the first pressing plate, and a blank area is formed between the oil passing port and the first pressing plate through the steps.

2. The oilproof assembly according to claim 1, wherein diversion trenches are arranged between the steps and between the steps and a cavity wall of the cavity, and the first air vents are opposite to the diversion trenches.

3. The oilproof assembly according to claim 2, wherein the oil passing port is a strip-shaped port, one end of each of the diversion trenches is opposite to the strip-shaped port, and a slope is arranged between each of the diversion trenches and the oil passing port.

4. The oilproof assembly according to claim 1, wherein a first seal ring is arranged at a periphery of the first pressing plate, and the first pressing plate hermetically abuts against a cavity wall of the cavity through the first seal ring.

5. The oilproof assembly according to claim 1, further comprising:

a second pressing plate, wherein one side of the second pressing plate abuts against the first filter element, the other side thereof abuts against one end of the elastic part, the second pressing plate is provided with a plurality of second air vents, and the second air vents are opposite to the first filter element; and positioning structures for positioning the elastic part are arranged in the middle of the second pressing plate and the middle of the limiting part.

6. The oilproof assembly according to claim 5, wherein a second seal ring is arranged at a periphery of the second pressing plate, and the second pressing plate hermetically abuts against a cavity wall of the cavity through the second seal ring.

7. The oilproof assembly according to claim 1, further comprising:

a waterproof ventilating film arranged in the cavity at the second end and located between the limiting part and the ventilating channel.

8. The oilproof assembly according to claim 1, further comprising:

a second filter element arranged between the limiting part and the ventilating channel.

9. The oilproof assembly according to claim 8, further comprising:

a waterproof ventilating film arranged in the cavity at the second end and located between the limiting part and the ventilating channel; and a separator plate, wherein one side of the separator plate abuts against the second filter element and the other side thereof abuts against one side of the waterproof ventilating film, the separator plate is provided with a plurality of third air vents, and the third air vents are opposite to the second filter element.

10. The oilproof assembly according to claim 8, wherein the diameter of the side of the limiting part close to the second filter element is greater than the diameter of the side close to the first filter element, and the diameter of the second filter element is greater than the diameter of the first filter element.

11. The oilproof assembly according to claim 1, wherein the first filter element is of a filter structure formed by stacking a plurality of filter cartridges.

12. The oilproof assembly according to claim 1, wherein the elastic part is configured to:

not extrude oil in the first filter element when the first filter element does not absorb the oil or absorbs the oil to swell and the thrust applied by the elastic part to the first filter element is less than a preset value; and extrude at least part of the oil in the first filter element when the first filter element absorbs the oil to swell and the thrust applied by the elastic part to the first filter element is greater than or equal to the preset value.

13. An oilproof vent valve, comprising:

an oilproof assembly according to claim 1; and a protective cover arranged at a second end of a valve body of the oilproof assembly, the ventilating channel being arranged between the protective cover and the valve body.

14. The oilproof vent valve according to claim 13, wherein diversion trenches are arranged between the steps and between the steps and a cavity wall of the cavity, and the first air vents are opposite to the diversion trenches.

15. The oilproof vent valve according to claim 14, wherein the oil passing port is a strip-shaped port, one end of each of the diversion trenches is opposite to the strip-shaped port, and a slope is arranged between each of the diversion trenches and the oil passing port.

16. The oilproof vent valve according to claim 13, wherein a first seal ring is arranged at a periphery of the first pressing plate, and the first pressing plate hermetically abuts against a cavity wall of the cavity through the first seal ring.

17. The oilproof vent valve according to claim 13, further comprising:

a second pressing plate, wherein one side of the second pressing plate abuts against the first filter element, the other side thereof abuts against one end of the elastic part, the second pressing plate is provided with a plurality of second air vents, and the second air vents are opposite to the first filter element; and positioning structures for positioning the elastic part are arranged in the middle of the second pressing plate and the middle of the limiting part.

18. A device provided with an oil tank, comprising:

an oil tank; and an oilproof vent valve mounted on the oil tank, the oilproof vent valve being the oilproof vent valve according to claim 13.

* * * * *